Aug. 25, 1925.
B. T. HEADLEY ET AL
1,551,513
METHOD AND APPARATUS FOR FEEDING GLASS
Filed March 15, 1921   11 Sheets-Sheet 1
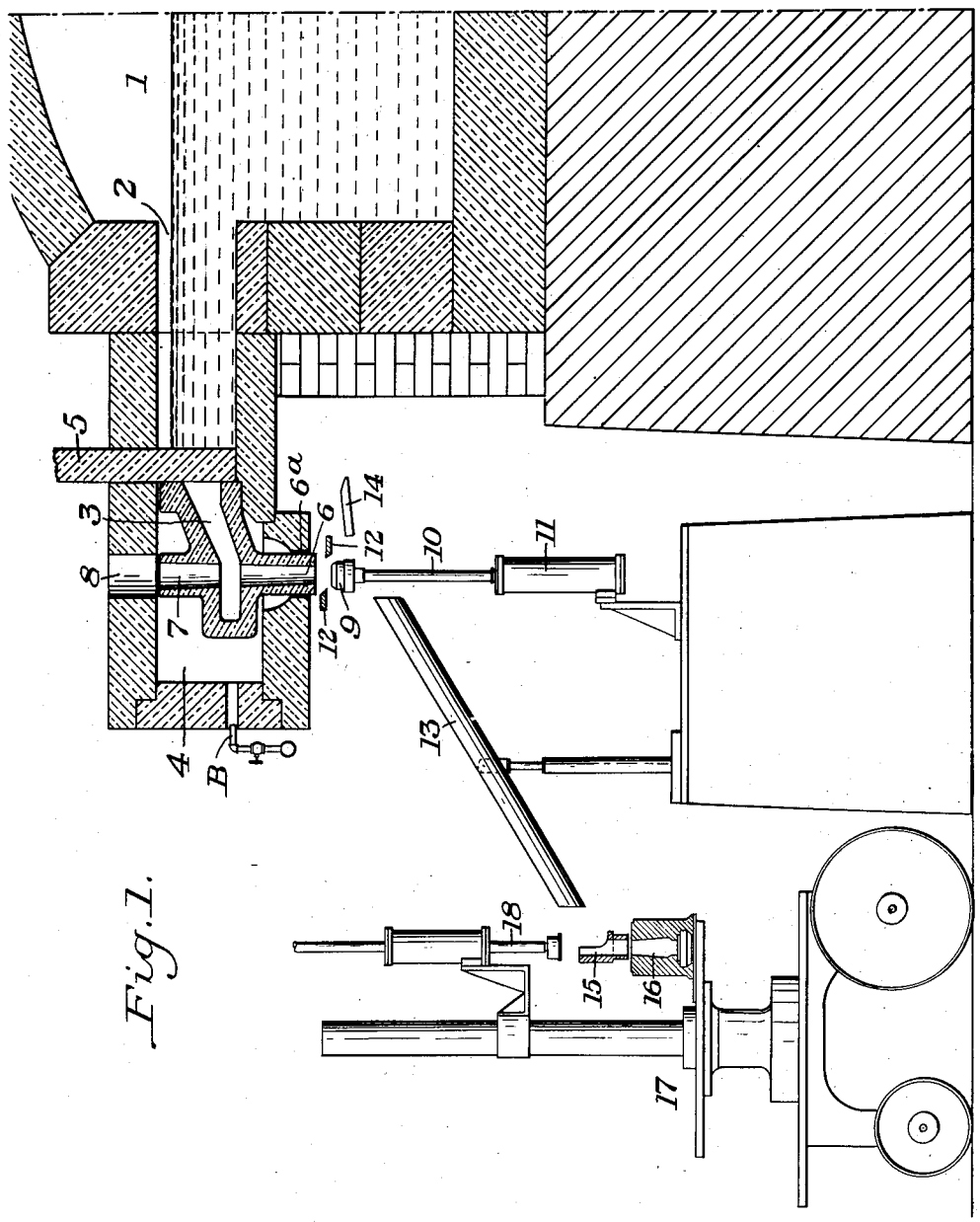

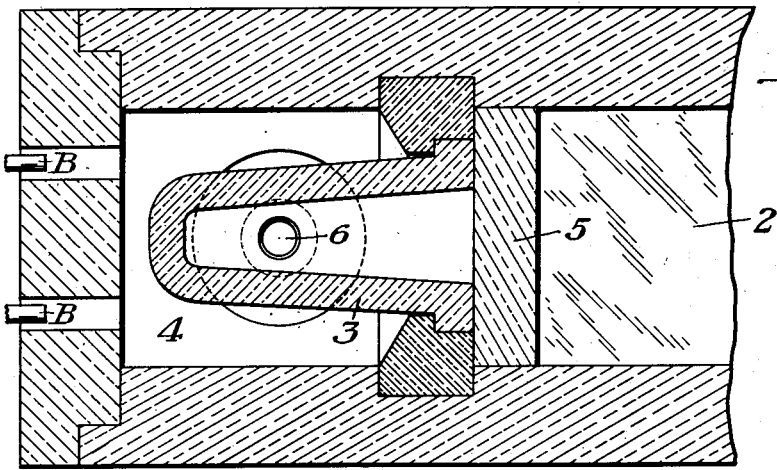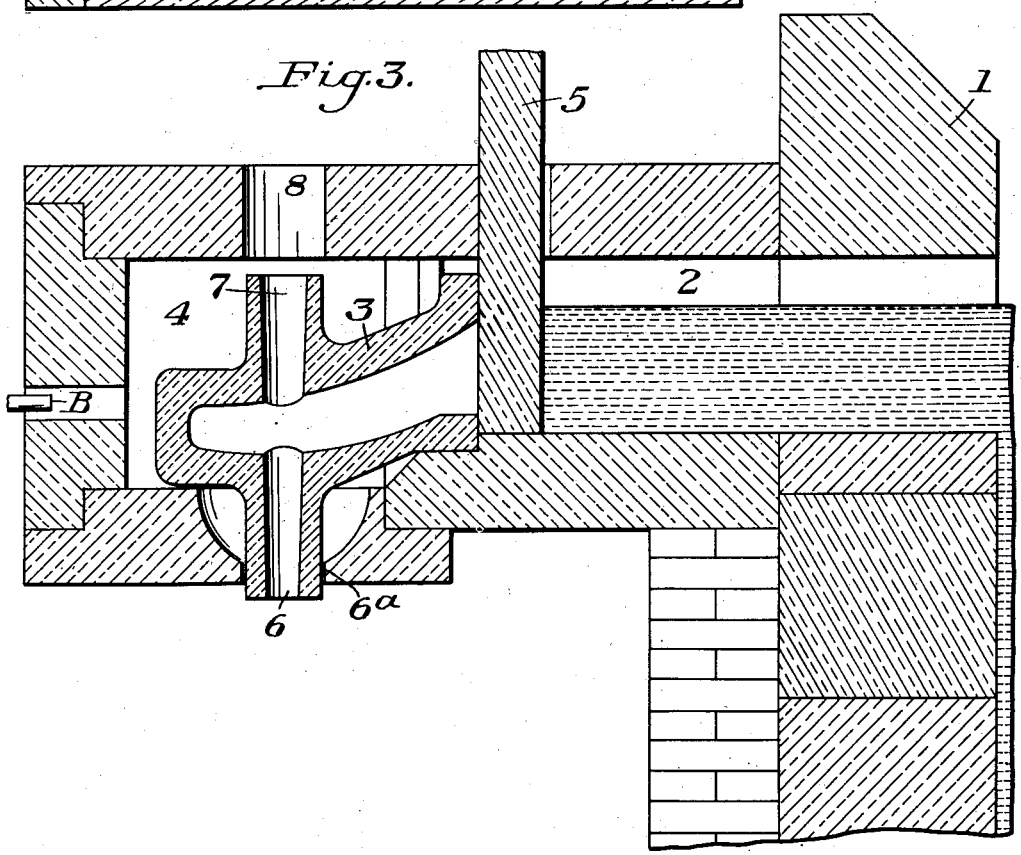

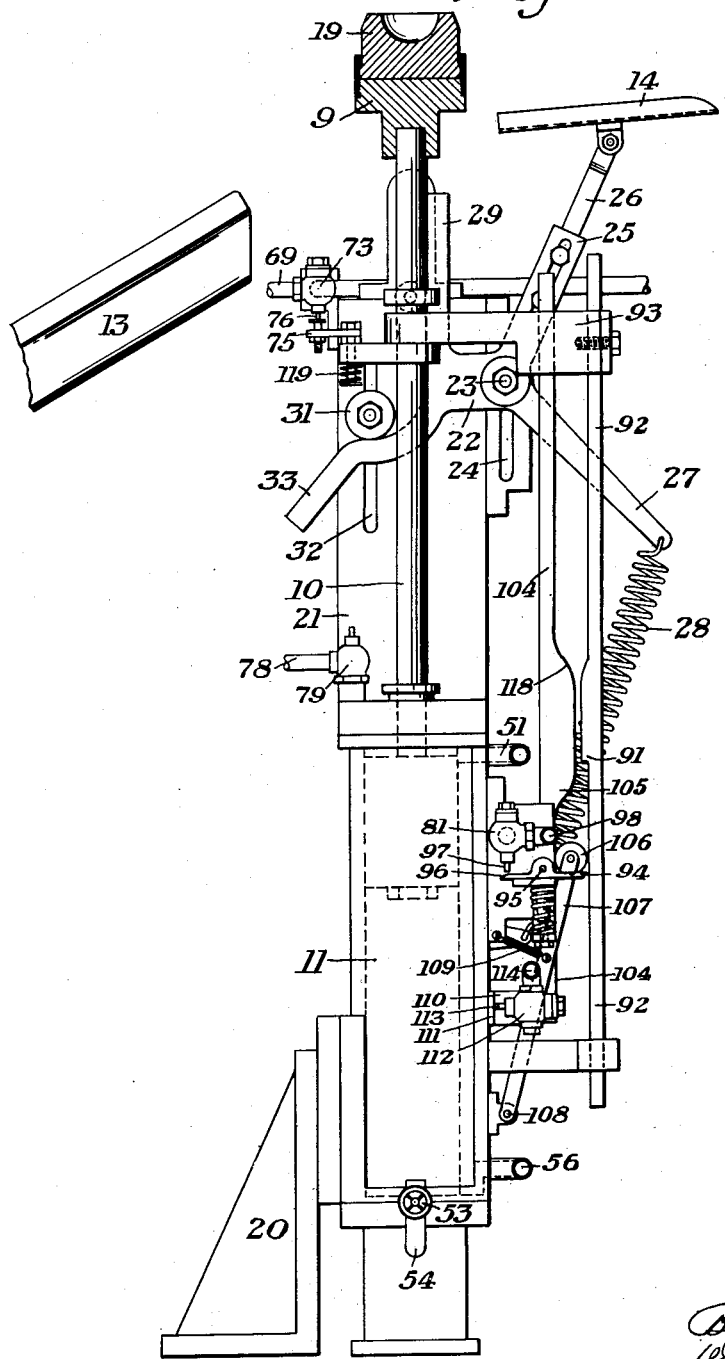

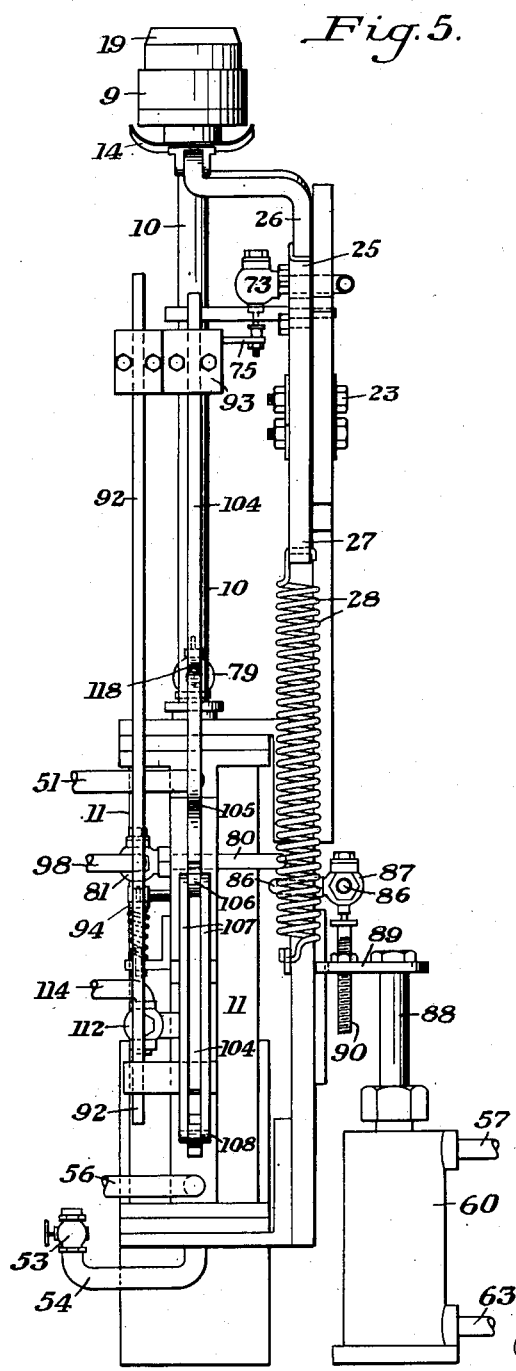

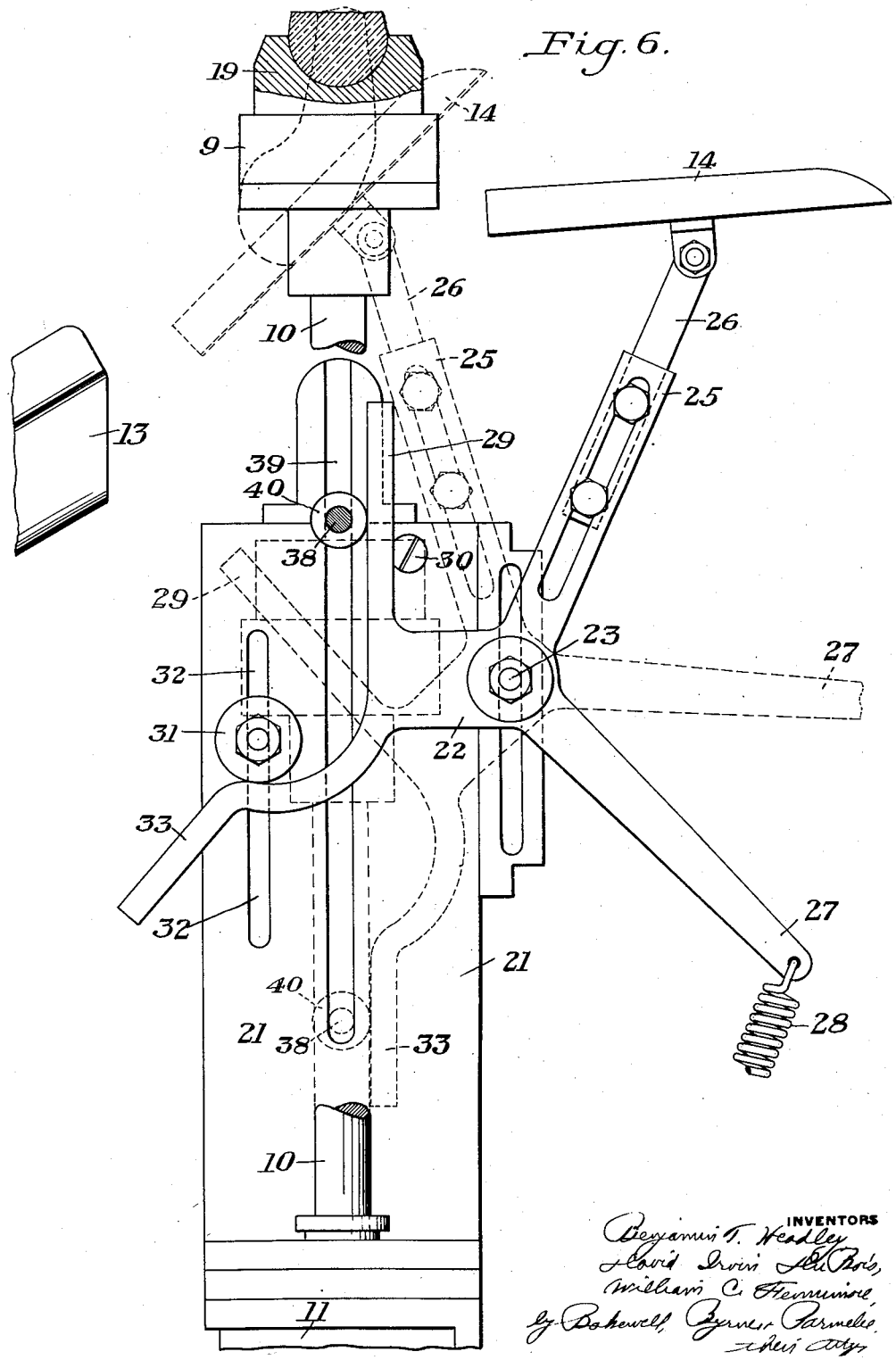

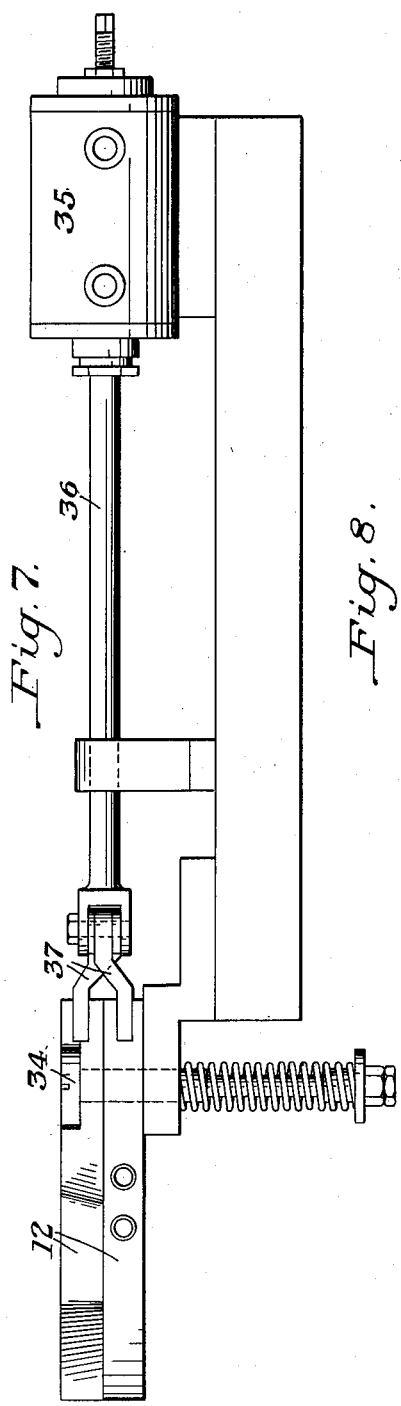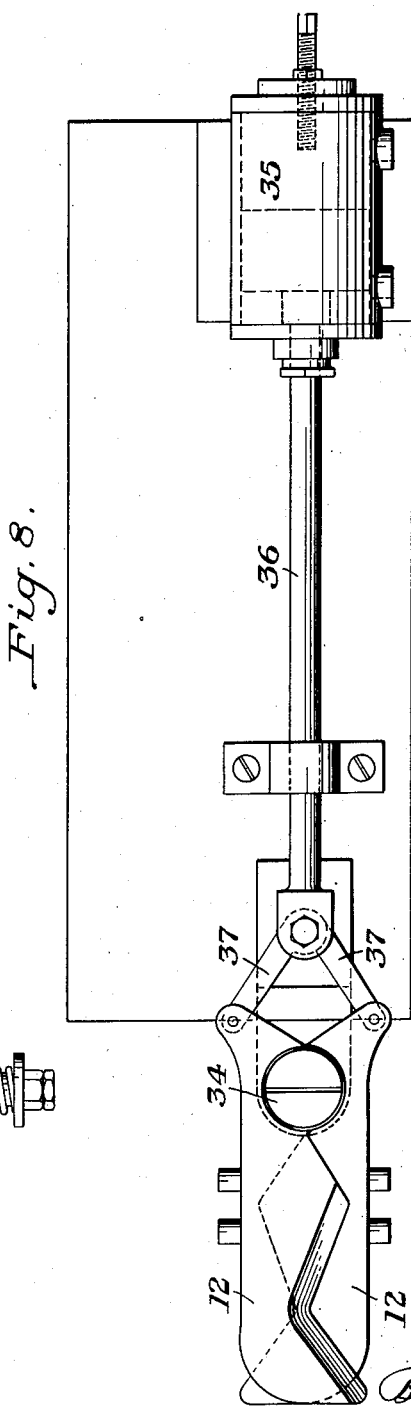

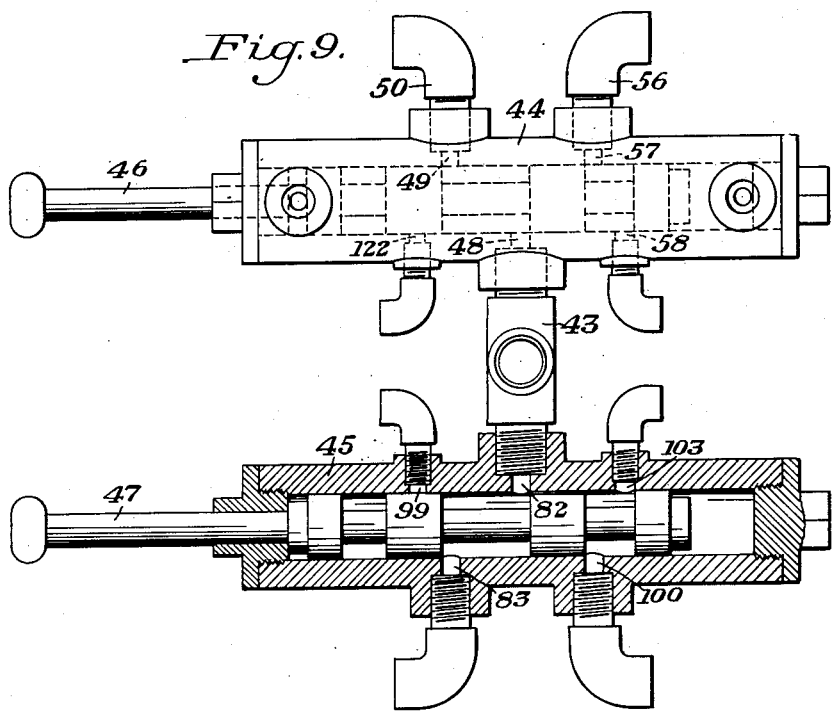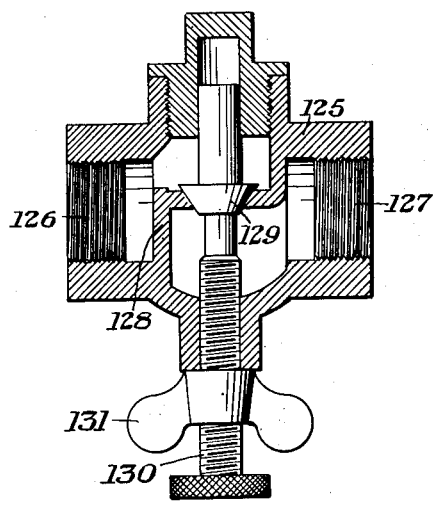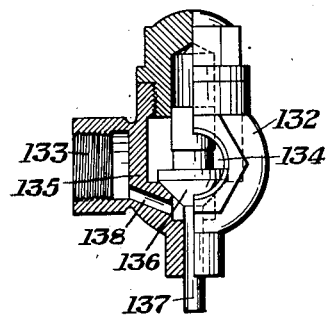

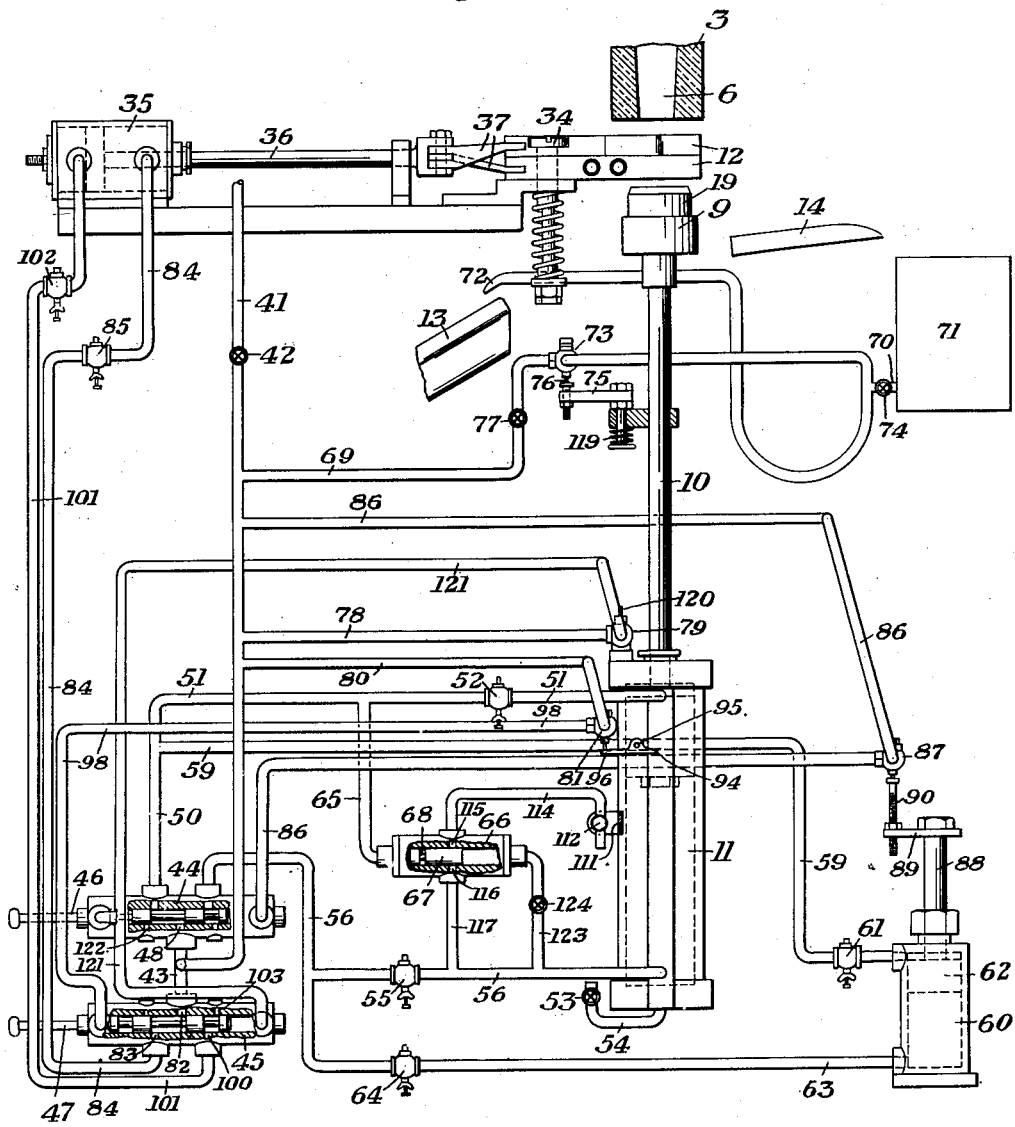

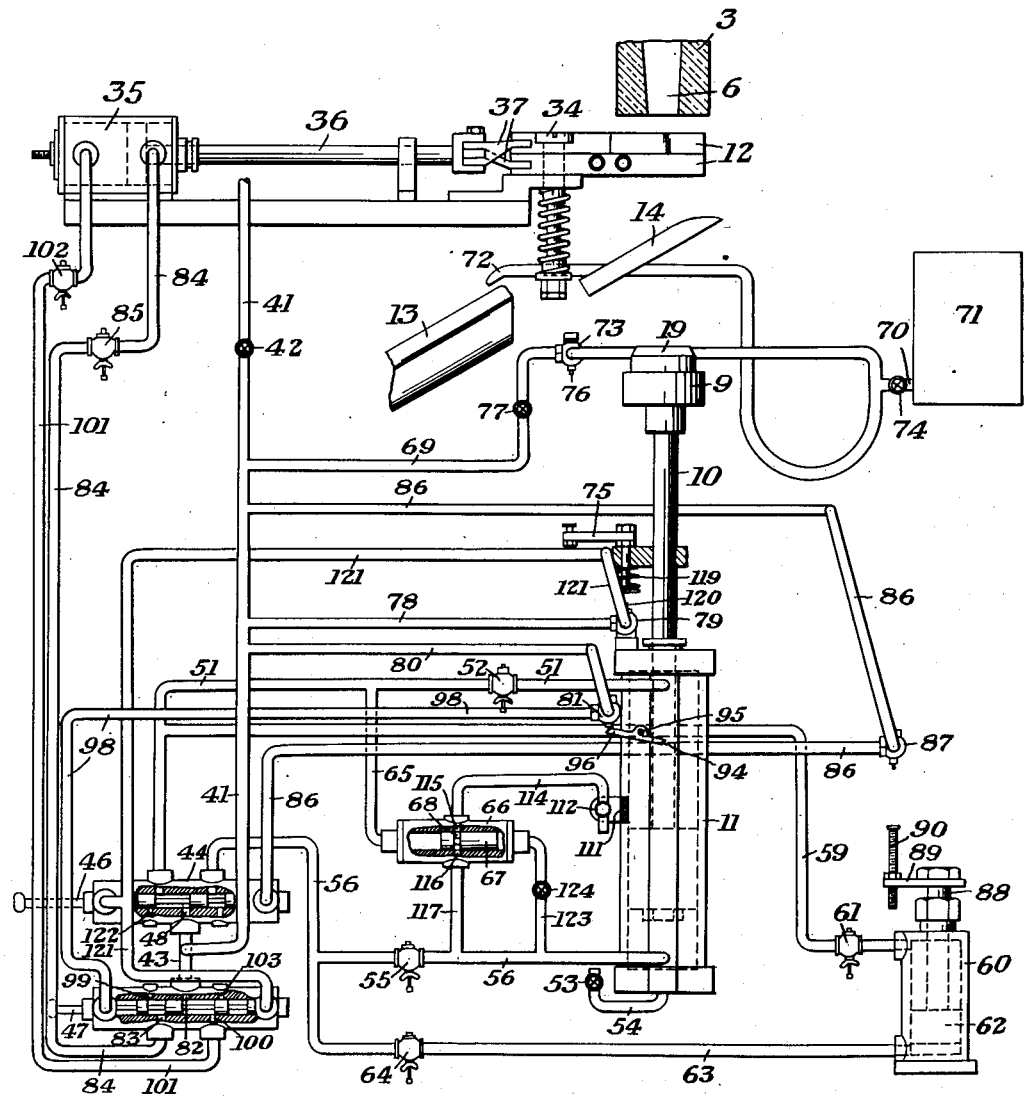

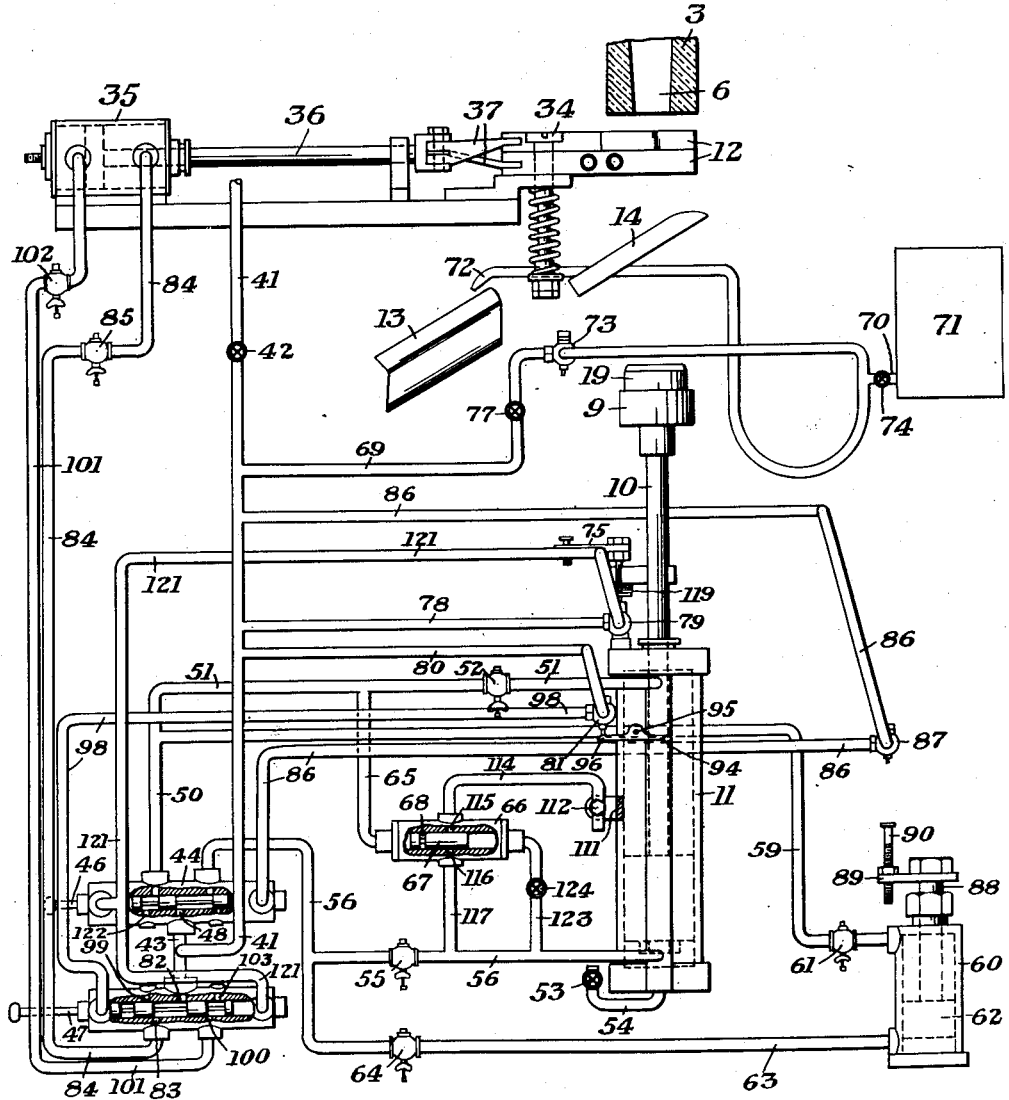

Patented Aug. 25, 1925.

1,551,513

UNITED STATES PATENT OFFICE.

BENJAMIN T. HEADLEY, DAVID IRVIN Du BOIS, AND WILLIAM C. FENNIMORE, OF MILLVILLE, NEW JERSEY, ASSIGNORS TO WHITALL-TATUM COMPANY, OF MILLVILLE, NEW JERSEY, A CORPORATION OF NEW JERSEY.

METHOD AND APPARATUS FOR FEEDING GLASS.

Application filed March 15, 1921. Serial No. 452,581.

*To all whom it may concern:*

Be it known that we, BENJAMIN T. HEADLEY, DAVID IRVIN DU BOIS, and WILLIAM C. FENNIMORE, all citizens of the United States, residing at Millville, in the county of Cumberland and State of New Jersey, have invented a new and useful Improvement in Methods and Apparatus for Feeding Glass, of which the following is a full, clear, and exact description.

The present invention relates broadly to the art of delivering molten glass from a melting furnace and, more particularly, to an automatically operable glass feeding device and method, for successively forming the charges or gathers of predetermined shape, size and weight, from a continuously flowing stream.

An important object of the present invention is to provide means for automatically separating charges or gathers of predetermined characteristics from the flowing stream of glass and delivering the same to a suitable glass working machine.

Another object of the present invention is to provide means for engaging the free end of a flowing stream of glass, and movable with said glass for a controllable length of time, to temporarily support the same and shape the gather.

Still another object of the invention is to provide a supporting means of the character described which is vertically operable in the line of flow of the stream of glass issuing from the furnace, and which is regulable to vary the speed of movement thereof to change the size of the gather.

A further object of the invention is to provide a supporting means adapted to control the operation of the severing means for the stream of glass and also the transfer of the severed charge to a glass working machine.

A still further object of the invention is to provide a fluid pressure system for controlling the operation of the feeding and shaping devices.

An additional object of the present invention is to provide means for obliterating the shear marks on the fresh end of the flowing stream by redistributing the heat of the glass mass without the application of radiant heat from an external source.

The foregoing and other objects of the present invention, together with their attendant advantages, will be apparent as the invention becomes understood by reference to the accompanying specification and drawings forming a part thereof, it being premised that changes may be made in the various details and manner of operation within the scope of the appended claims without departing from the spirit of the invention.

Figure 1 is a diagrammatic view partly in section, illustrating the present invention and its relationship to a melting furnace and glass working machine;

Figure 2 is a horizontal sectional view through the delivery chamber and flow tube;

Figure 3 is a vertical sectional view through the construction illustrated in Figure 2 and also through a portion of the melting furnace;

Figure 4 is a side elevation of the feeder cup and its associated mechanism as viewed in Figure 1, certain of the parts being in section;

Figure 5 is a side view of the construction illustrated in Figure 4;

Figure 6 is a side view on an enlarged scale of the feeder sweep and its operating mechanism as viewed in Figure 4.

Figure 7 is a side elevation of the shearing mechanism;

Figure 8 is a top plan view of the mechanism illustrated in Figure 7;

Figure 9 is a detail view of the floating control valves, one of the valves being illustrated in section;

Figures 10 and 11 are detail sectional views of different forms of bleeder and check valves;

Figure 12 is a diagrammatic view illustrating the parts of the apparatus in initial position for receiving glass issuing from the flow tube in the delivery chamber of the furnace.

Figure 14 is a view corresponding to

Figure 13:
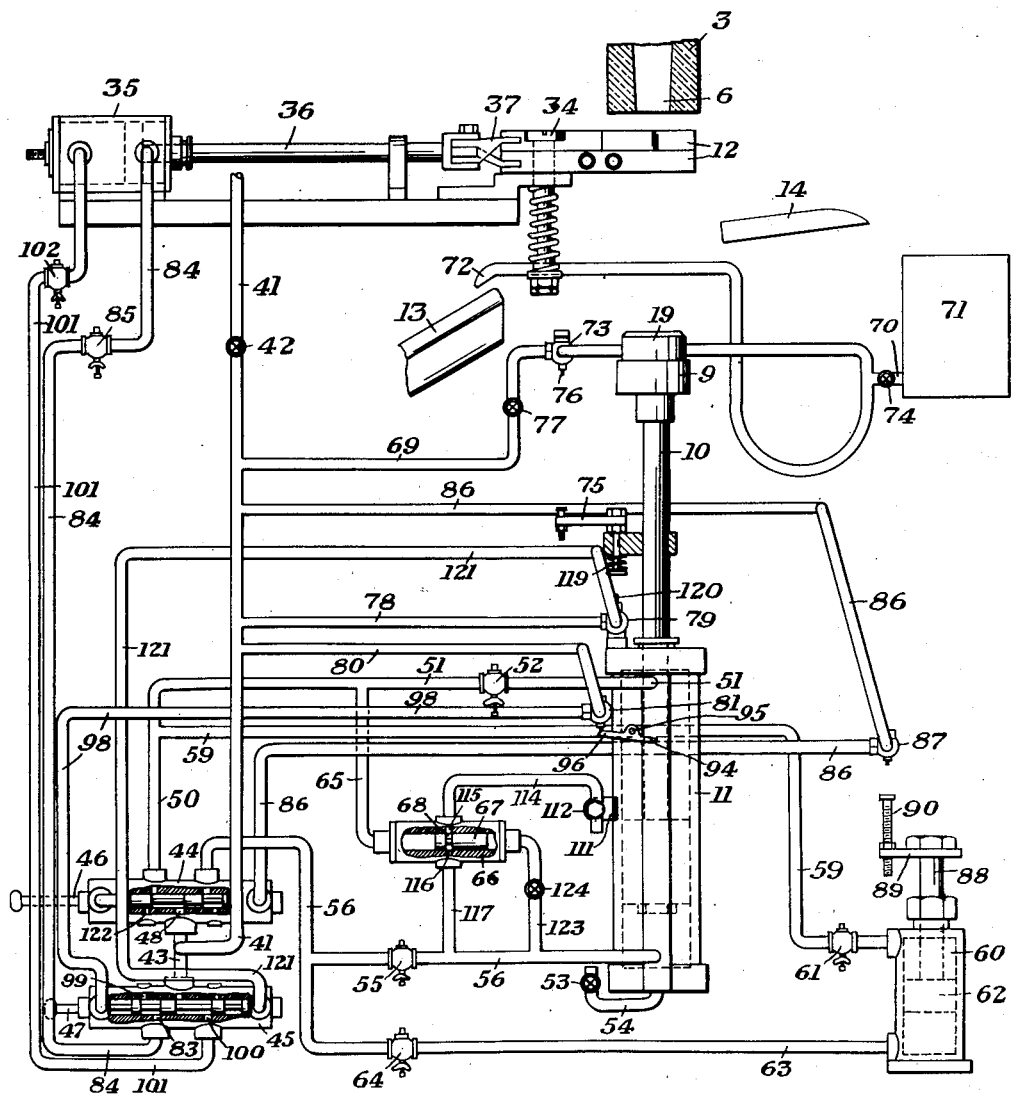
Figure 13 is a view, corresponding to Figure 12, illustrating the parts in an intermediate position.

Figure 13, illustrating another position of the parts, and

Figure 15 is a view corresponding to Figure 14, illustrating the position of the parts just before they are returned to the positions illustrated in Figure 12.

Due to the peculiar properties of molten glass, it has been made the subject of a great deal of study, and many attempts have been made to automatically form gathers suitable both as to size and shape, for the making of glass objects such as bottles, insulators and the like. In some of the mechanisms designed for this purpose, the glass has been run directly into a rotary receiver provided with one or more pockets adapted to shape the glass gathers and separate the same from a flowing stream by the rotation of the receiver, to successively shear the stream. Due to the "freezing" of the glass in the mechanism during handling, such devices have not proven satisfactory commercially.

In other types of machines, shears or molds functioning as shears, have been provided between the furnace and the molding devices, adapted to be operated either by the weight of the glass, or at predetermined periods, to cut the stream into separate masses. The tendency of the glass to string out and the difficulty of controlling the stream or flow have prevented the extensive use of such machines. Still other machines have been designed for the purpose of controlling the stream or flow of glass by the application or removal of pressure either to the body of the glass prior to its passage to the flow-out opening, or to the end of the stream subsequent to its passage through said opening, but the production of gathers of suitable shapes by such machines has been accompanied with considerable difficulty.

In accordance with the present method, there is utilized a machine adapted to control the flow of glass not only by controlling the temperature of the issuing glass, but by directly supporting the glass stream for a period of time dependent upon the size of the gather desired, and regulable to permit the formation of gathers of different sizes.

Referring more particularly to the drawings, there is illustrated in Figure 1 a portion of a glass melting furnace 1 having an auxiliary supply chamber 2 adapted to supply molten glass to a flow tube 3 located in the delivery chamber 4 of the furnace. The passage of the glass to the flow tube 3 may be controlled by a suitable gate valve 5 as is customary in the glass art. It will be understood that the various parts of the furnace may be constructed of suitable refractory material to prevent the adhesion of the glass thereto and permit the same to rapidly pass through the opening 6 in the bottom of the flow tube. The delivery chamber 4 may be heated in any desired manner, such as burners B, for the purpose of maintaining the issuing glass at the proper temperature, and the flow tube may be provided with an upper opening 7 adapted to align with an opening 8 in the top of the delivery chamber to permit the insertion of suitable means for manually freeing the flow-out opening 6 from hardened glass as found necessary. There is preferably formed a space 6ª between the walls of the delivery chamber and the sides of the flow tube to permit the flames to pass freely therethrough.

The construction of the flow tube shown herein is disclosed and claimed in the copending application of Benjamin T. Headley and David Irvin Du Bois, Serial No. 44,984, filed July 21, 1925.

Mounted below the delivery chamber 4 and in line with the flow-out opening 6, is a feeder cup 9 carried by a piston rod 10 adapted to be reciprocated vertically in the line of flow of the issuing stream of glass by fluid pressure cylinder 11 as will be more fully pointed out hereinafter.

Adjacent the discharge opening of the flow tube 3 is located a shearing device, preferably comprising blades 12 adapted to sever the stream of glass into gathers of the desired shape and size, these gathers being transferred to a trough 13 by a sweep 14, as will be more clearly apparent hereinafter. The trough 13 may be so supported that its discharge end is adapted to deliver the gathers through guides 15 to suitable molds 16 of a glass working machine 17. In the present instance, this machine is illustrated as comprising a bottle blowing apparatus of any desired construction, having a suitable blow head 18.

Referring more particularly to Figures 4, 5 and 6, the feeder cup is illustrated as comprising a removable glass-supporting portion 19 which may be constructed of carbon, or other material adapted to engage and support molten glass without adhering thereto. The cylinder 11, which is supported on a fixed bracket 20, has mounted adjacent thereto a back-plate 21, to one side of which is adjustably supported a multiple arm lever 22 by a pivot 23 vertically adjustable in a slot 24 of the back-plate. One of the arms 25 of the lever 22 is provided with an adjustable lever 26 carrying the sweep 14 for transferring the severed gather to the trough 13. For properly maintaining the sweep 14 in the position illustrated in Figure 6, there is hooked to the arm 27 of the lever 22 a tension spring 28, the opposite end of which may be suitably connected to the back-plate 21, as illustrated in Figures 4 and 5. For limiting the movement of the lever 22 under the influence of the tension spring, there may be provided an arm 29 on the lever 22 adapted to engage the fixed stop 30 carried by the back-plate 21. Cooperating with the stop 30 is an adjustable stop 31, movable vertically in the slot 32 in the back-plate 21 and adapted to engage the curved arm 33 of the lever 22 when the same has been brought to the desired position by the tension spring.

After the feeder cup 9 has been lowered to a predetermined position by the cylinder 11 and piston 10, the shear blades 12, illustrated in detail in Figures 7 and 8, are adapted to be moved from the position shown in Figure 1, to the closed position illustrated in Figure 8, to sever the stream of glass and thereby form a gather. This closing movement of the shear blades 12 about their pivot 34, is accomplished by means of a fluid pressure cylinder 35 controlling the movement of the piston rod 36, which is connected to the shear blades 12 by suitable links 37. Substantially simultaneous with the severance of the stream, the feeder cup drops out of engagement with the glass and the sweep 14 is moved from its full line position, shown in Figure 6, to its dotted line position shown in Figure 6, by the travel of the piston rod 10. This operation is accomplished by securing to the piston rod a laterally projecting arm 38 slidable in the slot 39 in the back-plate 21 and provided with a roller 40, cooperating with the arm 29 of the lever 22 and adapted, upon continued down travel of the piston rod 10, to engage the upper curved surface of the arm 33 and move the same against the action of the spring 28, to the dotted line position illustrated in Figure 6. This movement of the sweep 14 causes it to engage the end of the glass stream and transfer the severed gather into the trough 13. After the piston rod 10 has completed its downward stroke, its direction of travel is reversed and it is again caused to assume its normal position illustrated in Figure 4 by fluid pressure connections, which will be described in detail.

The operation of the entire mechanism hereinbefore described is adapted to be controlled by means of air pressure, and the connections for accomplishing such control are illustrated diagrammatically in Figures 12 to 15.

Referring more particularly to Figure 12, which figure represents the parts in their initial position for receiving a stream of glass as it issues from the flow-tube in the delivery chamber of the furnace, there is provided an air pressure line 41, which may have the usual form of control valve 42, and connected to a pipe 43 communicating with the central portions of the casings 44 and 45, respectively, of floating control valves comprising pistons 46 and 47, respectively, as illustrated in detail in Figure 9. At this time, the valve pistons are both in their left-hand positions and fluid pressure passes from the pipe 43 through the port 48, casing 44 and port 49 into the pipe 50. This pipe 50 is provided with a branch 51 leading through a bleeder check valve 52, as shown in Figure 10, to the upper end of the cylinder 11 tending to start the piston therein traveling in a downward direction. The exhaust from the cylinder 11, and consequently the speed of descent of the piston 10, is controlled by a globe valve 53 in the line 54 connected to the bottom of the cylinder 11 and by the bleeder check valve 55 in the line 56 leading from the lower portion of the cylinder 11 into the valve casing 44, through which it is connected by means of ports 57 and 58 with the atmosphere.

At the same time, air under pressure passes through the branch 59 of the pipe 50 to the upper end of a timing cylinder 60, this air passing freely through the valve 61. This starts the piston 62 therein in a downward direction, the cylinder 60 at this time exhausting through the pipe 63 and bleeder check valve 64 to the pipe 56 and thence to the atmosphere as before described. Also connected to the branch 51 is a line 65 leading to the left hand side of a bleeder relief valve casing 66 having reciprocably mounted therein a piston 67 provided with a transverse port 68. Pressure in the line in the pipe 65 tends to move the piston 67 to the right, as viewed in Figure 12.

With the parts in their initial position as illustrated in this figure, air is also supplied from the pressure line 41 by means of a pipe 69 to an ejector 70 which is connected to a tank 71 filled with a suitable spraying or cooling fluid for delivering a predetermined amount thereof through a suitable nozzle 72 to the interior or exterior of the trough 13. The flow of air through the pipe 69 is controlled by a valve 73, such as shown in Figure 11, and the flow of fluid from the tank 71 may be controlled by a suitable valve 74. For holding the valve 73 open at this time to permit the passage of air to the nozzle 72, there is secured to the piston rod 10 an arm 75 adapted to contact with the stem 76 of the valve and hold the same in open position. Inasmuch as the valve 73 is controlled by the arm 75, it will be apparent that the downward movement of the piston 10 permits the valve to close thereby rendering the spraying and cooling device inoperative until such time as the piston shall again assume the position shown in Figure 12. The amount of air passing through the pipe 69 may be manually regulated by a suitable globe valve 77 operating in any well known manner.

At this time the air under pressure also passes from the line 41 through the pipe 78 to a valve 79, corresponding to the valve 73 and described in detail hereinafter, normally maintained in closed position by the air pressure and adapted to be opened when the piston 10 has reached a predetermined position in its downward movement. Air under pressure also passes from the pressure line 41 through the pipe 80 to a valve 81, corresponding to the valves 73 and 79, and held at this time in closed position.

As it is necessary during the initial formation of the gather to have the shear blades in open position to permit the stream to flow therethrough, air under pressure is permitted to pass from the pipe 43 through the port 82 in the valve casing 45 and thence by way of port 83 into the pipe 84 leading through bleeder check valve 85 into the right hand end of the cylinder 35 for maintaining the piston rod 36 in its retracted position as illustrated in Figure 12.

Also communicating with the pressure line 41 is a pipe 86 communicating at its opposite end with the right hand end of valve casing 44. Intermediate its ends this pipe is provided with a valve 87 which is held in open position when the piston 62 in the timing cylinder 60 is in its upper position, the piston rod 88 being provided with an arm 89 carrying an adjustable contact 90 adapted to engage the valve stem for this purpose. Pressure through this line tends to maintain the floating valve piston 46 in its left hand position as before described. It will be apparent that as the timing piston descends under the influence of air supplied through the pipe 59, the valve 87 will be permitted to close thereby cutting off the air pressure to the right hand end of the valve casing 44 to permit subsequent movement of this piston to the right.

In Figure 13 the parts of the apparatus are illustrated in an intermediate position to which they are moved by the air connections just described in detail. The piston 10 has descended a short distance permitting the valve 73 to close, and the timing piston 62 has also descended, thereby permitting the valve 87 to close. The piston 67 has also moved to the right a short distance, bringing its port 68 into exhausting position, as will be pointed out in detail hereinafter. With the parts in this position, the cam 91 on the rod 92, illustrated in detail in Figure 4, as carried by an arm 93 secured to the piston 10 so as to travel vertically therewith, will have engaged the end 94 of a flipper lever having a pivotal mounting 95, thereby causing the front end 96 of the flipper to be raised into the position illustrated in Figure 13. This operation of the flipper will bring the end 96 into engagement with the stem 97 of the valve 81, thereby opening the valve and permitting pressure to flow from the pipe 80 through the valve 81 into the pipe 98, which supplies pressure to the left hand end of the floating valve casing 45. This will move the piston 47 therein to the right. This movement of the valve 47 will permit the pipe 84, which has previously been supplied with pressure to maintain the shears in retracted position, to exhaust through the ports 83 and 99 to the atmosphere. At the same time air under pressure will be supplied through the ports 82 and 100 to the line 101 communicating with the left hand end of the pressure cylinder 35 through a bleeder check valve 102. This will cause a movement of the piston rod 36 to the right, thereby closing the shears and severing the gather from the stream of glass issuing from the flow tube 3. It will be apparent that when the members were in the position illustrated in Figure 12, the pipe 101 was free to exhaust through the ports 100 and 103 in the valve casing 45, to permit the piston rod 36 to travel to the left as before described.

During this same time, the downward movement of the rod 104 carried by the arm 93, as shown in Figure 4, will have brought the cam surface 105 thereon into engagement with the roller 106. This roller is rotatably carried by an arm 107 having a pivotal mounting 108 and held normally in such position as to insure engagement between the roller and the cam surface by a tension spring 109. Intermediate its ends, the arm 107 is provided with a yoke 110, the cross portion 111 of which is adapted to operate a valve 112 by engagement with the stem 113 thereof. As the arm 107 moves outwardly under the influence of the cam surface 105, the valve 112 will be opened. By reference to Figure 13, it will be noted that the valve 112 controls the exhaust through the line 114 connected with an intermediate portion of the bleeder valve casing 66 and communicating with the interior thereof through a port 115. In its diametrically opposite side the valve casing 66 is provided with a second port 116 in communication with the line 56, permitting exhaust from the lower end of the cylinder 11, through a pipe connection 117. At this time, the ports 115 and 116 are in communication by the transverse exhausting port 68 in the bleeder relief valve piston. Due to the opening of the valve 112, it will be apparent that a substantially unrestricted exhaust is provided for the lower end of the cylinder 11, permitting a rapid descent of the piston 10 and its associated parts. This rapid movement of the piston 10 withdraws the feeder cup 9 from engaging supporting position with respect to the stream of glass, substantially simultaneously with the severing operation of the shears.

Substantially simultaneously with the withdrawal of the feeder cup 9 and the closing of the shears 12, the sweep 14 is moved from its full line position illustrated in detail in Figure 6 and diagrammatically in Figures 10 and 13, into the dotted line position of Figure 6 and the full line position of Figure 14, as before described in detail by engagement of the roller 40 with the upper curved surface of the arm 33. In Figure 14 the parts of the apparatus are illustrated in this further intermediate position just before the piston 10 reaches the limit of its downward travel.

It is desirable to check the rapid descent of piston 10, without damage to any of the parts, and this is automatically accomplished by forming a cushion in the bottom of cylinder 11. By reference to Figure 4, it will be noted that the rod 104 is provided with a second cam surface 118 which permits a retractile movement of the arm 107 under the influence of spring 109 when the roller 106 engages this surface. This causes the valve 112 to close thereby restricting the exhaust from cylinder 11 by compelling all exhausting air to pass through bleeder check valve 55 in the line 56 and globe valve 53 and forms an air cushion in the cylinder 11 insuring the desired action of the piston 10 and its associated parts.

This final movement of the piston 10 will bring the arm 75 into such position that the spring stop 119 thereon will engage the stem 120 of the check valve 79, as shown in Figure 15, and open the valve. With the valve in open position air will flow from the pressure line 41 through pipe 78 and the valve to the pipe 121 connected to the left hand end of floating valve casing 44 and the right hand end of floating valve casing 45, thereby causing the pistons 46 and 47 to move to the right and left, respectively. Movement of the piston 46 to the right permits the pipe 50 and its branches 51, 59 and 65 to exhaust through ports 49 and 122 to the atmosphere, and supplies air under pressure from pipe 43 through ports 48 and 57 to pipe 56 leading to the bottom of cylinder 11, and pipe 63 leading to the bottom of timing cylinder 60. The bleeder check valves 52 and 61 at this time permit a restricted exhaust as will be explained in detail, while the bleeder check valves 55 and 64 permit a free passage of air tending to raise the pistons 10 and 62, respectively. Movement of piston 47 to the left restores it to the position shown in Figure 12 and opens line 101 to exhaust and line 84 to pressure for returning the shears to their inoperative position.

It is essential during the upward movement of the pistons 10 and 62 to restore the bleeder relief valve piston 67 to the position shown in Figure 12, and this is accomplished by providing a connection 123 between the line 55 and the right hand end of the casing 66 for moving the piston to the left. This connection may have any desired form of manual control valve 124, as shown for regulating the quantity of air supplied through this connection.

As the piston 10 reaches its upward limit of travel, the arm 75 will engage the stem 76 of the valve 73 and open the same in preparation for the spraying or cooling action, while the contact 90 will be brought into engagement with the stem of the valve 87 by the upward travel of the timing piston. This will open the valve 87, permitting air once more to flow through the pipe 86 to the right hand end of floating valve casing 44 for moving the piston 46 to its original position as shown in Figure 12 for a second cycle of operations.

During the upward travel of the rod 92, its cam 91 will ride freely by the flipper end 94. The operation of the valve 112 by the movement of the arm 107 at this time will be immaterial as air through the connection 123 will have moved the bleeder relief valve to the left.

In Figure 10 there is illustrated in detail a form of bleeder check valve corresponding to valves 52, 55, 61, 64, 85 and 102 described herein. As illustrated, this may comprise a casing 125 having openings 126 and 127 thereinto, separated by a partition 128 having a seat for a valve 129. The position of the valve with respect to the seat may be regulated by screw 130, separate from the valve 129, and thumb nut 131. With the valve 129 held slightly away from its seat, air entering at 126 will have a restricted escape, while air entering at 127 will raise the valve and escape freely therethrough. By this construction applicants can successfully control the speed of exhaust from the various parts of the apparatus without restricting pressure supply at other periods in the cycle of operations.

By adjusting the bleeder check valve 61 controlling the exhaust from the upper end of the timing cylinder it is possible to vary the time interval required for the feeder cup to complete a cycle of operations, and thereby control the size and shape of the gather. In the same manner, by adjusting the bleeder check valve 55 controlling the exhaust from the lower end of cylinder 11 applicants can vary the length of time the feeder cup 9 remains in contact with the lower end of the stream of glass.

In Figure 11 there is illustrated in detail a form of valve which may be used for the valves 73, 79, 81, 87 and 112. This may comprise a casing 132 having openings 133 and 134 separated by a partition 135 having a valve seat for valve 136 adapted to be raised and lowered by stem 137. When the stem 137 is engaged to move the valve from its seat, air may flow freely from opening 134 around the valve 136, and through the port 138 to opening 133, while with the valve seated, this communication is cut off and flow through the casing is prevented.

From the foregoing it will be apparent that we have provided an apparatus having various means for adjusting the speed of movement of the different parts whereby the desired time intervals may be obtained. These intervals determine the size and shape of the gather and enable an accurate regulation in this respect.

The advantages of the present invention arise from the provision of a method and apparatus having time controlling elements whereby the gather may be varied as to shape, weight and size.

Further advantages arise from the provision of means for mechanically engaging and supporting the free end of a stream of glass for assisting in shaping the same.

Still further advantages arise from the direction of movement of the supporting means and from the provision of means for transferring a severed gather to the desired working point.

We claim:

1. In the method of forming glass gathers, the steps consisting in producing a glass stream, temporarily mechanically engaging and movably supporting the free end of said stream before the desired length of gather is attained to thereby shape the stream, and severing the stream to produce a gather when the desired length and shape is attained, substantially as described.

2. In the method of forming glass gathers, the steps consisting in producing a continuously flowing glass stream, temporarily mechanically engaging and movably supporting the free end of said stream before the desired length of gather is attained to thereby shape the stream, and severing the stream to produce a gather when the desired length and shape is attained, substantially as described.

3. In the method of forming glass gathers, the steps consisting in the production of a glass stream, temporarily mechanically engaging and movably supporting the free end of said stream before the desired length of gather is attained to thereby shape the stream and to redistribute the heat within said end without the application of radiant heat, severing the stream to produce a gather when the desired length and shape is attained, and transferring the gather to a suitable glass working apparatus, substantially as described.

4. In the method of forming glass gathers, the steps consisting in producing a glass stream, temporarily bringing a movable support into contact with the stream, and moving the support with the glass at a speed less than the normal flow of the glass to thereby shape the stream, severing the stream when the desired gather has been produced, and delivering the gather to a mold substantially as described.

5. The method of forming glass gathers, comprising the production of a glass stream having a substantially vertical flow line, bringing a supporting means into engagement with the free end of said stream, mechanically moving said supporting means entirely in line with said vertical flow line, then substantially simultaneously removing said support from the free end of the stream, severing the stream to produce a gather and transferring the gather to a suitable glass-working apparatus, substantially as described.

6. The method of forming glass gathers, comprising the production of a glass stream having a substantially vertical flow line, bringing a support into temporary engagement with the free end of said stream, moving said support with said stream entirely in the direction of the line of flow, severing the stream to produce a gather and moving the gather independently of the support laterally to a suitable glass-working apparatus, substantially as described.

7. The method of forming glass gathers, comprising the production of a glass stream, bringing a support into contact with the free end of said stream, moving said support below the stream of glass while maintaining said supporting contact, then substantially simultaneously removing the support, severing the stream to produce a gather, and transferring the gather to a suitable glass-working apparatus, substantially as described.

8. The method of forming glass gathers, comprising the production of a glass stream, bringing a support into contact with the free end of said stream, moving said support with the stream of glass while maintaining said supporting contact, regulating the movement of said support to shape the flowing stream as desired, then substantially simultaneously removing the support and severing the stream to produce a gather and transferring the gather to a suitable glass working apparatus, substantially as described.

9. The method of forming glass gathers, comprising the production of a glass stream, bringing a support into contact with the free end of said stream, moving said support with the stream of glass while maintaining said supporting contact, then substantially simultaneously increasing the speed of movement of the support to withdraw it from supporting contact with the stream of glass, and severing the stream to produce a gather, and then transferring the gather to a suitable glass-working apparatus, substantially as described.

10. The method of forming glass gathers, comprising the production of a glass stream having a substantially vertical line of flow, moving a support along said line of flow into engagement with the free end of said stream, moving said support downwardly while maintaining engagement with the free end of said stream, withdrawing said support from supporting engagement, severing the stream to produce a gather, and moving said gather laterally, substantially as described.

11. A glass-working apparatus, comprising a source of molten glass having a flow opening, a support entirely movable in the direction and line of flow of a stream issuing from said opening for supporting said stream, and means for moving said support, substantially as described.

12. A glass-working apparatus comprising a source of molten glass having a glass stream flow opening, a support entirely movable in the direction and line of flow of said stream for supporting said stream, means for moving said support, means for severing the stream to produce a gather and means for moving said gather laterally independently of said support, substantially as described.

13. A glass-working apparatus, comprising a source of molten glass having a glass stream flow opening, a support entirely movable in the direction and line of flow of said stream for supporting said stream, means for moving said support and means for regulating the speed of movement of said support, substantially as described.

14. A glass-working apparatus, comprising a source of molten glass having a glass stream flow opening, a support entirely movable in the direction and line of flow of said stream for supporting the stream, means for moving said support, and means for variably timing the commencement of movement of said support, substantially as described.

15. A glass-working apparatus, comprising a source of molten glass having a glass stream flow opening, a support entirely movable in the direction and line of flow of said stream for supporting the stream, and fluid pressure operated means for moving said support, substantially as described.

16. A glass-working apparatus, comprising a source of molten glass having a stream flow opening, a support vertically movable through its entire travel in the line of flow of the stream of glass through said opening, a piston carrying said support, a cylinder for moving said piston, a control valve for said cylinder to control the admission of air to opposite ends thereof, and means controlled by said piston for operating said control valve, substantially as described.

17. A glass-working apparatus, comprising a source of molten glass having a stream flow opening, a support vertically movable through its entire travel in the line of flow of the stream of glass issuing through said opening for successively engaging the end of the glass stream, a piston carrying said support, a cylinder for raising and lowering said piston, a control valve for said cylinder to control the admission of air to the opposite ends thereof for effecting controllable movement of the piston in either direction, and a timing device for said control valve, substantially as described.

18. A glass-working apparatus, comprising a source of molten glass having a stream flow opening, a support vertically movable in the line of flow of the stream of glass issuing through the said opening, a piston carrying said support, a cylinder for raising and lowering said piston, and means for causing said piston to travel at instantaneously different speeds at different times during each lowering movement thereof, substantially as described.

19. A glass-working apparatus, comprising a source of molten glass having a stream flow opening, a support vertically movable in the line of flow of the stream of glass issuing through said opening, a piston carrying said support, a cylinder for raising and lowering said piston, said cylinder having a plurality of exhaust ports, and means for automatically changing the number of said ports which are simultaneously effective, substantially as described.

20. A glass-working apparatus, comprising a source of molten glass having a stream flow opening, a support vertically movable in the line of flow of the stream of glass issuing through said opening, a piston carrying said support, a cylinder for raising and lowering said piston, said cylinder having a primary exhaust port, a supplemental exhaust port, and means for opening said supplemental exhaust port at a predetermined point during the lowering of said piston to increase the speed of travel thereof, substantially as described.

21. A glass-working apparatus, comprising a source of molten glass having a stream flow opening, a support vertically movable in the line of flow of the stream of glass issuing through said opening, a piston carrying said support, a cylinder for raising and lowering said piston, said cylinder having a primary exhaust port, a supplemental exhaust port, means for opening said supplemental exhaust port at a predetermined point during the lowering of said piston to increase the speed of travel thereof, and means to subsequently close said supplemental exhaust port to cushion the descent of said piston, substantially as described.

22. A glass-working apparatus, comprising a source of molten glass having a stream flow opening, a support vertically movable in the line of flow of the stream of glass issuing through said opening, a piston carrying said support, a cylinder for raising and lowering said piston, said cylinder having means for varying the lowering speed of the piston, a control valve for said cylinder to control the admission of the air to opposite ends thereof, shears, means for operating said shears, and a second control valve for said shear-operating means, substantially as described.

23. A glass-working apparatus, comprising a source of molten glass having a stream flow opening, a support movable only in the line of flow of the stream of glass issuing through said opening, a piston carrying said support, a cylinder for raising and lowering said piston, a control valve for said cylinder to control the admission of the air to opposite ends thereof to effect controllable movement of the piston in either direction, shears, means for operating said shears, a second control valve for said shear-operating means, and means for timing the movement of said control valves, substantially as described.

24. A glass-working apparatus, comprising a source of molten glass having a stream flow opening, a support vertically movable in the line of flow of the stream of glass issuing through said opening, means for operating said support positively in both directions, shears, means for operating said shears, and an independent control valve for each of said means, substantially as described.

25. A glass-working apparatus, comprising a source of molten glass having a stream flow opening, a support vertically movable in the line of flow of the stream of glass issuing through said opening, means for operating said support positively in both directions, shears, means for operating said shears, an independent control valve for each of said means, and means for timing the movement of said valves, substantially as described.

26. A glass-working apparatus, comprising a source of molten glass having a stream flow opening, a support vertically movable in the line of flow of the stream of glass issuing through said opening, means for operating said support, a support control valve, shears, a shear-control valve, means controlled by the movement of said support for moving said shear-control valve in one direction, means controlled by the movement of said support for moving said shear-control valve in the opposite direction and moving said support-control valve, and a timing device for subsequently restoring said support-control valve to its original position, substantially as described.

27. A glass-working apparatus, comprising a source of molten glass having a stream flow opening, a support vertically movable in the line of flow of the stream of glass issuing through said opening, means for maintaining said support in engagement with the free end of said stream throughout a portion of its movement and subsequently withdrawing said support from such engagement, means for severing said stream to form a gather, and means for moving said gather laterally, substantially as described.

28. A glass-working apparatus, comprising a source of molten glass having a stream flow opening, a support vertically movable in the line of flow of the stream of glass issuing through said opening, means for maintaining said support in engagement with the free end of said stream throughout a portion of its movement and subsequently withdrawing said support from such engagement, means for severing said stream to form a gather, means for moving said gather laterally, said last mentioned means being controlled by the movement of said support, substantially as described.

29. A glass-working apparatus, comprising a support adapted to engage the free end of a stream of glass, means for moving said support in the line of flow of said stream, said means being effective for varying the speed of movement of said support to withdraw the same from supporting engagement with said stream, means for severing said stream to form a gather, and means for engaging said gather to move the same laterally, substantially as described.

30. A glass-working apparatus, comprising a support adapted to engage the free end of a stream of glass, means for moving said support in the line of flow of said stream, said means being effective for varying the speed of movement of said support to withdraw the same from supporting engagement with said stream, means for severing said stream to form a gather, and means for engaging said gather to move the same laterally, said means being controlled by the movement of said support, substantially as described.

31. A glass-working apparatus, comprising a support, means for moving said support vertically, a pivotally mounted sweep, and means controlled by the movement of said support for operating said sweep, substantially as described.

32. A glass-working apparatus, comprising a support, means for moving said support vertically, a sweep, and means controlled by the movement of said support for operating said sweep, substantially as described.

33. A glass-working apparatus, comprising a feeder cup adapted to contact with a stream of glass, means for operating said feeder cup to maintain the same in contact with said stream for a predetermined length of time and subsequently increase the speed of movement of the cup to withdraw the cup from such supporting contact, means for severing the stream to form a gather, and means for engaging the gather while unsupported to move the same laterally, substantially as described.

34. A glass-working apparatus, comprising a feeder cup adapted to contact with a stream of glass, means for operating said feeder cup to maintain the same in contact with said stream for a predetermined length of time and subsequently increase the speed of movement of the cup to withdraw the cup from such supporting contact, means for severing the stream to form a gather, means for engaging the gather to move the same laterally, and a trough for receiving and conveying said gather, substantially as described.

35. A glass-working apparatus, comprising a source of molten glass having a flow opening, a mold, a movable support adapted to engage the glass stream issuing from said opening, and means for moving said support vertically throughout its entire travel in the line of flow of the glass, substantially as described.

36. In the method of forming glass gathers, the steps consisting in producing a stream of glass, and then temporarily mechanically contacting and supporting the free end only of said stream to decrease the normal flow tendency of the glass under the influence of gravity, while maintaining the entire body of the stream in motion, substantially as described.

37. A glass working apparatus, comprising a source of molten glass having a flow opening, a support movable only in the direction and line of flow of a stream issuing from said opening for supporting said stream, and means for moving said support, substantially as described.

38. A glass working apparatus, comprising a source of molten glass having a glass stream flow opening, a support movable only in the line of flow of said stream for supporting said stream, means for moving said support, means for severing the stream to produce a gather, and means for moving said gather laterally independently of said support, substantially as described.

39. A glass working apparatus, comprising a source of molten glass having a glass stream flow opening, a support movable only in the line of flow of said stream for supporting said stream, means for moving said support, and means for regulating the speed of movement of said support, substantially as described.

40. A glass working apparatus, comprising a source of molten glass having a glass stream flow opening, a support movable only in the line of flow of said stream for supporting the stream, means for moving said support, and means for variably timing the commencement of movement of said support, substantially as described.

41. A glass working apparatus, comprising a source of molten glass having a glass stream flow opening, a support movable only in the line of flow of said stream for supporting the stream, and fluid pressure operated means for moving said support, substantially as described.

42. A glass working apparatus, comprising a source of molten glass having a glass stream flow opening, a mold, a support movable only in the line of flow of said stream for supporting the stream to form a gather for said mold, means for moving said support, means for severing the gather, and means for transferring the gather to said mold, substantially as described.

43. A glass working apparatus, comprising a source of molten glass having a stream flow opening, a support movable only in the line of flow of the stream of glass issuing through said opening, means for operating said support at predetermined speeds in both directions, shears, means for operating said shears, and an independent control valve for each of said means, substantially as described.

44. A glass working apparatus, comprising a source of molten glass having a stream flow opening, a support vertically movable only in the line of flow of the stream of glass issuing through said opening, means for operating said support positively in both directions, shears, means for operating said shears, controlling means for both of said last mentioned means, and means for timing the movement of said controlling means, substantially as described.

45. A glass working apparatus, comprising a source of molten glass having a stream flow opening, a mold, a support movable only in the line of flow of the stream of glass issuing through said opening, a piston carrying said support, a cylinder for raising and lowering said piston, a control valve for said cylinder to control the admission of fluid to the opposite ends thereof, and a timing device for said control valve, substantially as described.

46. A glass working apparatus, comprising a source of molten glass having a stream flow opening, a mold, a support movable only in the line of flow of the stream of glass issuing through said opening, means for operating said support in both directions, shears, means for operating said shears, and controlling means for both of said last mentioned means, substantially as described.

47. In the method of forming glass gathers, the steps consisting in producing a stream of glass, temporarily mechanically contacting and supporting the free end only of said stream to decrease the normal flow tendency of the glass under the influence of gravity while maintaining the entire body of the stream in motion, severing the stream to form a gather, and delivering the gather to a mold, substantially as described.

In testimony whereof, we have hereunto set our hands.

BENJAMIN T. HEADLEY.
DAVID IRVIN Du BOIS.
WILLIAM C. FENNIMORE.